United States Patent [19]
Singhal

[11] Patent Number: 5,407,151
[45] Date of Patent: Apr. 18, 1995

[54] MODEL PLANE FLIGHT CONTROL

[76] Inventor: Tara C. Singhal, P.O. Box 5075, Torrance, Calif. 90510

[21] Appl. No.: 27,441

[22] Filed: Mar. 8, 1993

[51] Int. Cl.[6] .......................................... B64C 13/02
[52] U.S. Cl. ................................ 244/76 R; 446/175; 73/147
[58] Field of Search ............. 244/3.13, 75 R, 76 R, 244/183, 186, 189, 190; 446/175; 318/257, 480; 250/210; 73/147

[56] References Cited

U.S. PATENT DOCUMENTS

| | | | |
|---|---|---|---|
| 3,621,356 | 11/1971 | Kwan | 446/175 |
| 3,818,700 | 6/1974 | Kantrowitz et al. | 244/53 R |
| 3,849,931 | 11/1974 | Gulley, Jr. | 446/175 |
| 4,828,525 | 5/1989 | Okano | 446/175 |
| 4,865,575 | 9/1989 | Rosenthal | 446/175 |

*Primary Examiner*—Galen L. Barefoot

[57] ABSTRACT

A device for flight control of a model plane has a plurality of photo cell sensors, preferably, located on the wing tips, nose and tail and connected to a logic circuit inside the body of the plane. The logic circuit, computes the location of the model plane based on the sum and differential output of the sensors, and outputs electronic signals that drive the servo motors controlling the plane. The logic circuit can be calibrated to individually calibrate the rudder, elevator and the throttle electronic signal output, based on the light received by the photo cell sensors. Inside an enclosed space, a focussed beam of light is directed at the model plane. The logic circuit, receives the sensors' output, and using them computes the location of the model plane within the beam of light. The focused beam of light is swivel attached to a motorized control for swiveling the reflector housing in a predetermined pattern of a closed path racetrack holding pattern and a closed path figure eight holding pattern. Preferably, used in conjunction with radio control having a radio transmitter, a radio receiver, whose output drives the servo motors controlling the plane when the electronic signals at the antenna wire are such that they can be overridden by signals from radio control transmitter, when the radio transmitter is actively broadcasting. When used in conjunction, the plane can be handed over and then retrieved from the beam of light.

6 Claims, 1 Drawing Sheet

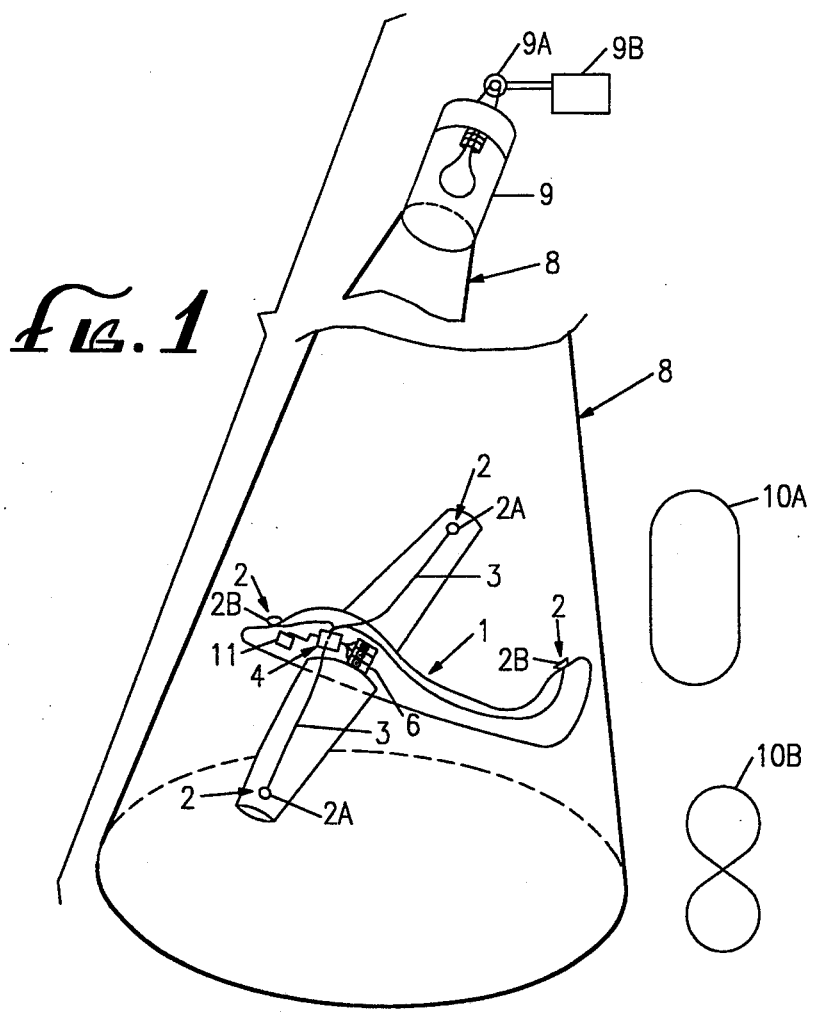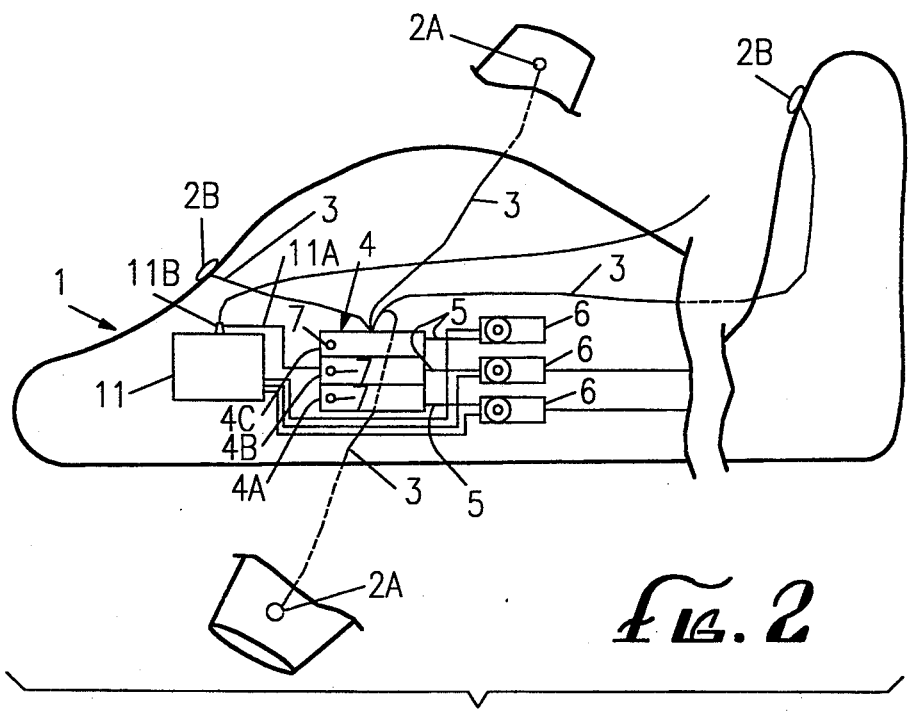

MODEL PLANE FLIGHT CONTROL

CROSS REFERENCE

U.S. patent application Ser. No. 08/123,584, filed on Jul. 6, 1992 by Tara C. Singhal and titled "Devices and Means to Engage in Indoor Flight of Radio Controlled Model Aircrafts", now abandoned.

BACKGROUND

1. Field

Cross reference, discloses devices and means for model plane flights in an enclosed space. In an enclosed space, it is desirable to have a model plane fly, without a person actively engaged in flying the plane using radio control.

Flights of model planes, in the enclosed space, unassisted by active radio control could be used for many uses. One use is for display demonstrations for advertising purposes. A model plane flying on its own inside an enclosed space is believed to be a crowd attracting opportunity for advertising either the hobby of model flights or other advertisements.

Another distinct use is for allowing the hobbiers who are flying model planes in an enclosed space to be able to "park" the model plane in a holding pattern flight. This will enable them to take a break from actively flying the plane. One more distinct use, is for hobbiers to hand over the plane to a beam of light which then would automatically guide the plane to a landing area, in the enclosed space. Many other uses are possible even though not specifically disclosed herein.

A cost effective way to maintain a model plane's flight on a repeatable pattern inside an enclosed space is possible by using photo cell sensors on the body of the plane and a moving beam of light directed on to the model plane from a location inside the enclosed space. The model plane would stay in the moving beam of light.

The photo sensor technology is available at very low cost, based on the use of photo cells in the ordinary photo cell operated night lights and other devices costing only a few dollars. A logic circuit inside the model plane can easily convert the difference of sensors' light output to a signal controlling the servo motors of the model plane which in turn are controlling the model plane.

2. Related Prior Art

None, to my knowledge.

SUMMARY

A device and method of enabling the model plane to repeatably maintain its flight in a holding pattern under control of an external moving beam of light, without the use of radio control is presented.

The device for flight control of a model plane has a plurality of photo cell sensors placed on the body of the model plane. The photo cell sensors are, preferably, located on the wing tips, nose and tail of the plane. The sensors are connected to a logic circuit inside the body of the plane.

The logic circuit, receives the sensor's output, computes the location of the model plane based on the sum and differential output of the sensors, and outputs electronic signals. The logic circuit is comprised of a rudder control logic, an elevator control logic, and preferably, a throttle control logic. The electronic signals are used to drive the servo motors controlling the plane's flight.

The logic circuit can be calibrated to individually calibrate the rudder, elevator and the throttle electronic signal outputs, based on the amount of light received by the photo cell sensors.

Inside an enclosed space a focussed beam of light is directed at the model plane. The logic circuit, receives the sensors' output, and using them computes the location of the model plane within the beam of light. The electronic signals are dependent on the relative light received at the different sensors. The electronic signals then drive servo motors controlling the plane's flight.

The focused beam of light is, preferably, a light source mounted in a focussed beam reflector housing. The housing is attached to a gimbal arrangement allowing swivel of the reflector and thus the beam of light. The swivel is attached to a motorized control for swiveling the reflector housing in the preferred patterns of a closed path racetrack holding pattern and a closed path figure eight holding pattern.

The device described above for controlling a model plane's flight in an enclosed space can also be used in conjunction with radio control having a radio transmitter and a radio receiver inside the plane. The receiver's output drives the servo motors controlling the plane. This enables handing over and then retrieving the model plane from the beam of light.

The electronic control signals output from the logic circuit are converted to radio frequency output suitable for reception by the radio receiver. The radio frequency output to the receiver is connected via its antenna wire connection. The electronic signals at the antenna wire are such that they can be overridden by signals from the radio control transmitter, when the radio transmitter is actively broadcasting. The radio receiver responds to the radio frequency signals from the logic circuit in absence of radio control transmitter signals.

BRIEF DESCRIPTION OF THE DRAWINGS:

FIG. 1. Light beam for controlling a model plane's flight path in an enclosed space with optional radio remote control.

FIG. 2. A device for controlling a model plane flight, showing photo sensors, the logic circuit and the servos.

DESCRIPTION

The invention is described with reference to FIGS. 1 and 2. A device for flight control of a model plane (1) has a plurality of photo cell sensors placed on the body of the model plane (2). Preferably the photo cell sensors are located on the wing tips (2a), nose and tail (2b). The sensors are connected (3) to a logic circuit (4) inside the body of the plane. The logic circuit, receives the sensor's output, computes the location of the model plane based on the sum and differential output of the sensors, and outputs electronic signals (5). The electronic signals are used to drive the servo motors (6) controlling the plane's flight.

The logic circuit is comprised of a rudder control logic (4a) that compares the photo cell sensor output received from the sensors placed on wing tips and outputs a rudder control electronic signal proportional to the difference in the cells' output. And an elevator control logic (4b) that compares the photo cell sensor output received from the sensors placed on nose and tail tips and outputs an elevator control electronic signal proportional to the difference in the cells' output. And, preferably, a throttle control logic (4c) that compares the photo cell sensor output received from the sensors placed on nose and tail tips and outputs a throttle control electronic signal proportional to the difference in the cells' output.

The logic circuit can be calibrated by a calibration means (7) to individually calibrate the rudder, elevator and the throttle electronic signal output, based on the amount of light received by the photo cell sensors.

A device for controlling a model plane's flight inside an enclosed space has a focussed beam of light (8) directed at the model plane. The logic circuit, receives the sensors' output, and using them computes the location of the model plane within the beam of light.

The electronic signals are dependent on the light received at the sensors. The electronic signals then drive servo motors controlling the plane's flight. The logic circuit has calibrating means to calibrate the electronic signal output, based on the light received by the photo cell sensors, thereby enabling the calibration of degree of movement of control surfaces.

The focused beam of light is, preferably, a light source mounted in a focussed beam reflector housing (9). The housing is attached to a gimbal arrangement (9a) allowing swivel of the reflector and thus the beam of light. The swivel is attached to a motorized control (9b) for swiveling the reflector housing in a predetermined pattern.

This arrangement enables the beam rotated in a repeatable predetermined pattern inside the enclosed space. The preferred patterns are of a closed path racetrack holding pattern (10a) and a closed path figure eight (10b) holding pattern, other patterns are possible.

The device described above for controlling a model plane's flight in an enclosed space can also be used in conjunction with radio control having a radio transmitter and a radio receiver, whose output drives the servo motors controlling the plane.

The model plane has a radio receiver (11) suitable for radio control of the model plane. The electronic control signals output from the logic circuit are converted to radio frequency output (11a) suitable for reception by the radio receiver. The radio frequency output to the receiver is connected (11b) via its antenna wire connection. The electronic signals at the antenna wire are such that they can be overridden by signals from radio control transmitter, when the radio transmitter is actively broadcasting. The radio receiver responds to the radio frequency signals from the logic circuit in absence of radio control transmitter signals.

Method of handing over and then retrieving the model plane from the beam of light having the following steps could be used. Normally fly the plane using radio control into the path of a moving beam of light, then keep the plane under the moving beam of light until the beam of light takes over the control of the model plane's flight path, then turn off the radio control transmitter. At a later time for retrieving a model plane flying under the beam of light as described above, turn on the radio control, then activate radio control commands to move the model plane away from under the beam of light, then on control the plane by the radio control.

Although the present invention has been described in considerable detail with regard to the preferred version thereof, other versions are possible. Therefore the appended claims should not be limited to the description of the preferred version contained herein.

What is claimed is:

1. A device for controlling a model plane's flight inside an enclosed space comprised of:
   (a) a focussed beam of light directed at a model plane;
   (b) a plurality of photo cell sensors placed on wings, nose and tail of the model plane;
   (c) the sensors connected to a logic circuit inside body of the plane, wherein the logic circuit comprised of:
      (i) a rudder control logic comparing the photo cell sensor output received from the sensors placed on the wings and outputting a rudder control electronic signal proportional to the difference in the cells' output;
      (ii) an elevator control logic comparing the photo cell sensor output received from the sensors placed on nose and tail and outputting an elevator control electronic signal proportional to the difference in the cells' output;
      (iii) the rudder and elevator control electronic signals driving servo motors controlling the plane's flight.

2. The device for controlling a model plane's flight inside an enclosed space as in claim 1, wherein the logic circuit further comprised of
   a throttle control logic comparing the photo cell sensor output received from the sensors placed on nose and tail and outputting a throttle control electronic signal proportional to the difference in the cells' output.

3. The device for controlling a model plane's flight inside an enclosed space as in claim 1, wherein the focussed beam of light comprised of:
   (a) a light source mounted in a focussed beam reflector housing attached to a mechanism allowing swivel of the beam of light;
   (b) the mechanism attached to a motorized control for swiveling the reflector housing in a repeatable pattern.

4. The device for controlling a model plane's flight inside an enclosed space as in claim 1, further comprised of:
   (a) the model plane having a radio receiver, whose output driving the servo motors controlling the plane's rudder and elevator, and a radio transmitter for controlling the plane;
   (b) the logic circuit outputting the rudder and elevator control electronic signals in radio frequency form suitable for reception by the radio receiver;
   (c) the radio receiver responding to the radio frequency form signals in absence of the radio transmitter signals, whereby
      (i) using radio transmitter, flying the plane into the beam of light thereby enabling the beam of light to control the model plane's flight path and
      (ii) using radio transmitter, flying the plane away from under the beam of light, thereby enabling the radio transmitter to control the model plane's flight path.

5. A device for flight control of a model plane comprised of:
   (a) a plurality of photo cell sensors placed on the body of the model plane such as on wings, nose and tail;
   (b) the sensors connected to a logic circuit inside body of the plane;
   (c) the logic circuit, receiving the sensors' output, computing the location of the model plane based on the sum and differential output of the sensors, and outputting electronic signals that drive servo motors controlling the plane's flight, wherein the logic circuit comprised of:

(i) a rudder control logic comparing the photo cell sensor output received from the sensors placed on the wings and outputting a rudder control electronic signal proportional to the difference in the cells' output;

(ii) an elevator control logic comparing the photo cell sensor output received from the sensors placed on the nose and tail and outputting an elevator control electronic signal proportional to the difference in the cells' output.

6. A device for flight control of a model plane as in claim 5, wherein the logic circuit further comprised of a throttle control logic comparing the photo cell sensor output received from the sensors placed on the nose and tail and outputting a throttle control electronic signal proportional to the difference in the cells' output.

* * * * *